(12) United States Patent
Chang et al.

(10) Patent No.: US 8,260,821 B2
(45) Date of Patent: Sep. 4, 2012

(54) GLOBAL, DYNAMIC, REMOTE AND CENTRAL SYSTEM FOR DATABASE DRIVER CONFIGURATION

(75) Inventors: David Wei-Jye Chang, San Jose, CA (US); Bilung Lee, Fremont, CA (US); Paul Arnold Ostler, Boise, ID (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 12/025,981

(22) Filed: Feb. 5, 2008

(65) Prior Publication Data

US 2009/0199211 A1 Aug. 6, 2009

(51) Int. Cl.
*G06F 7/00* (2006.01)
*G06F 17/30* (2006.01)

(52) U.S. Cl. ........................................ 707/802; 707/803

(58) Field of Classification Search .................... None
See application file for complete search history.

(56) References Cited

U.S. PATENT DOCUMENTS

| | | | |
|---|---|---|---|
| 5,721,904 A * | 2/1998 | Ito et al. ........................ | 707/769 |
| 5,838,918 A | 11/1998 | Prager et al. | |
| 6,029,196 A | 2/2000 | Lenz | |
| 6,189,000 B1 | 2/2001 | Gwertzman et al. | |
| 6,252,858 B1 | 6/2001 | Inoue | |
| 6,256,676 B1 | 7/2001 | Taylor et al. | |
| 6,308,178 B1 | 10/2001 | Chang et al. | |
| 6,687,698 B1 * | 2/2004 | Nixon et al. ........................ | 1/1 |
| 6,732,360 B1 * | 5/2004 | Seo et al. ........................ | 719/310 |
| 7,065,746 B2 | 6/2006 | Szabo et al. | |
| 7,076,766 B2 | 7/2006 | Wirts et al. | |
| 7,143,101 B2 | 11/2006 | Oliver et al. | |
| 7,150,037 B2 | 12/2006 | Wolf et al. | |
| 7,171,458 B2 | 1/2007 | Brown et al. | |
| 7,305,613 B2 | 12/2007 | Oezgen | |
| 7,404,195 B1 | 7/2008 | Sawicki et al. | |
| 7,577,938 B2 | 8/2009 | Bent et al. | |
| 7,593,956 B1 * | 9/2009 | Yakovlev .............................. | 1/1 |
| 7,665,064 B2 | 2/2010 | Able et al. | |

(Continued)

FOREIGN PATENT DOCUMENTS

WO 03090021 10/2003

OTHER PUBLICATIONS

Automated Model-based COnfiguration of Enterprise Java Applications, White et al, 11th IEEE International Enterprise Distributed Object COmputing Conference, 2007.*

(Continued)

*Primary Examiner* — Pierre Vital
*Assistant Examiner* — Augustine Obisesan
(74) *Attorney, Agent, or Firm* — Rabindranath Dutta; Konrad Raynes & Victor LLP

(57) ABSTRACT

A system, method and computer program product for database driver for the global, dynamic, remote and centralized configuration of database drivers. In an embodiment of the invention the system includes a remote controller host and a central controller disposed in the remote controller host. A plurality of application hosts and a plurality of applications are disposed in each of the application hosts. A single attachment agent is disposed in each of the application hosts, the single attachment agent being coupled to each of the plurality of applications in the application hosts. The central controller provides each of the attachment agents with information regarding how to connect the database driver to the central controller.

19 Claims, 4 Drawing Sheets

U.S. PATENT DOCUMENTS

| | | |
|---|---|---|
| 7,689,564 B2 | 3/2010 | Deen et al. |
| 7,827,201 B1 | 11/2010 | Gordon et al. |
| 7,870,188 B2 | 1/2011 | Mazzitelli et al. |
| 2003/0065670 A1 | 4/2003 | Bisson et al. |
| 2003/0132956 A1* | 7/2003 | Duncan et al. ............... 345/735 |
| 2003/0135505 A1* | 7/2003 | Hind et al. ................... 707/100 |
| 2003/0172368 A1 | 9/2003 | Alumbaugh et al. |
| 2003/0200209 A1* | 10/2003 | Smith et al. ...................... 707/3 |
| 2003/0204505 A1* | 10/2003 | Cotner et al. .................. 707/10 |
| 2004/0006549 A1* | 1/2004 | Mullins et al. ................... 707/1 |
| 2004/0044699 A1* | 3/2004 | He ................................ 707/201 |
| 2004/0230571 A1* | 11/2004 | Robertson ........................ 707/3 |
| 2005/0055325 A1* | 3/2005 | Dutt et al. ........................ 707/1 |
| 2005/0060169 A1* | 3/2005 | Gangadharan et al. ......... 705/1 |
| 2005/0066155 A1* | 3/2005 | Dutt et al. ........................ 713/1 |
| 2005/0181874 A1* | 8/2005 | Bond ............................. 463/36 |
| 2005/0205074 A1* | 9/2005 | Gibson et al. ................ 123/673 |
| 2005/0210060 A1* | 9/2005 | Borchers ...................... 707/102 |
| 2005/0228874 A1* | 10/2005 | Edgett et al. ................. 709/220 |
| 2005/0234947 A1* | 10/2005 | Minder et al. ................ 707/100 |
| 2005/0289177 A1* | 12/2005 | Hohmann et al. ........ 707/103 R |
| 2006/0017969 A1 | 1/2006 | Ly et al. |
| 2006/0179042 A1* | 8/2006 | Bram et al. ....................... 707/3 |
| 2006/0265385 A1* | 11/2006 | Agrawal et al. ................ 707/10 |
| 2007/0299822 A1* | 12/2007 | Jopp et al. ........................ 707/3 |
| 2010/0257200 A1 | 10/2010 | Lee et al. |

OTHER PUBLICATIONS

U.S. Appl. No. 12/418,410, filed Apr. 3, 2009, Lee et al.

Office Action 1, Jun. 20, 2011, for U.S. Appl. No. 12/418,410, Total 30 pp.

Amendment 1, Sep. 20, 2011, for U.S. Appl. No. 12/418,410, filed Apr. 3, 2009 by B. Lee et al., Total 13 pp. [57.222 (Amend1)].

Notice of Allowance 1, Feb. 24, 2012 for U.S. Appl. No. 12/418,410, filed Apr. 3, 2009 by B. Lee and P.A. Ostler, Total 16 pp. [57.222 (NOA1)].

* cited by examiner

GLOBAL, DYNAMIC, REMOTE AND CENTRAL SYSTEM FOR DATABASE DRIVER CONFIGURATION

FIELD OF INVENTION

The present invention generally relates to computer implemented information management systems, and particularly to systems and methods for database driver configuration.

BACKGROUND

There are a variety of software standards and products, which are used to connect to databases. One example is Java Database Connectivity (JDBC), which is an Application Programming Interface (API) for the Java programming language that defines how a client may access a database. Since Java interpreters (Java Virtual Machines) are available for all major client platforms, JDBC allows a platform-independent database application to be written.

JDBC employs JDBC drivers, which are client-side adaptors that convert requests from Java programs to a protocol that a database management system (DBMS) can understand. To accomplish this, JDBC drivers need to be configured to the requirements of the particular DBMS. The standard JDBC approach for configuration of database drivers is to use connection and data source properties. There are at least two problems with this approach: scope of configuration, and rebuild of applications. One example of the scope of configuration problem involves configuring the trace for diagnostics. In practice, configuring the trace on each connection or data source does not always provide a scope that is large enough to catch all diagnostic information in the database driver. This happens because an application may be using many connections and many data sources.

The second problem with the standard approach of configuration relates to the need to rebuild applications. An application will typically need to be shutdown, interrupting service, so that it can be rebuilt with new configuration properties. This standard approach to configuration tightly couples the configuration of database driver properties with the application itself which can severely affect maintenance and serviceability of an application in deployment.

One solution to the scope problem is a global configuration which can be set through an API. However, since it is an API, it still requires application rebuild, interrupting service. Another solution to the scope problem is the use of global properties. This approach may resolve both the scope and the rebuild problems. Unfortunately, it introduces another problem, which is that the database driver can only be configured statically. Global properties are loaded once when the application process is started, so configuration set through global properties is set at one time only.

Existing database driver configuration solutions do not resolve all the aforementioned issues together. Accordingly, there is a need for a system and method of database driver configuration that provides a global and dynamic solution which does not require application rebuilds.

SUMMARY OF THE INVENTION

To overcome the limitations in the prior art briefly described above, the present invention provides a method, computer program product, and system for configuring database drivers which is global, dynamic, remote and centralized.

In one embodiment of the present invention a system comprises: a first application host; a first application in the first application host; a first database driver coupled to the first application; a first remote interface coupled to the first database driver for facilitating the configuration of the first database driver; a central controller providing system-wide configuration information; and a first attachment agent providing a connection between the first remote interface and the central controller, the attachment agent containing specific information regarding how to connect the database driver to the central controller.

In another embodiment of the present invention, a database driver configuration system comprises: a remote controller host; a central controller disposed in the remote controller host; a plurality of application hosts; a plurality of applications disposed in each of the application hosts; a single attachment agent disposed in each of the application hosts, the single attachment agent being coupled to each of the plurality of applications in the application hosts, wherein the central controller provides each of the attachment agents with information regarding how to connect the database driver to the central controller.

In a further embodiment of the present invention a method of configuring a database driver comprises: receiving configuration information in an attachment agent; starting a new instance of a database driver in an application; detecting a new application using the attachment agent; attaching the attachment agent to the application; and configuring the database driver using the attachment agent.

In another embodiment of the present invention, a computer program product comprises a computer usable medium having a computer readable program, wherein the computer readable program when executed on a computer causes the computer to: receive configuration information in an attachment agent; start a new instance of a database driver in an application; detect a new application using the attachment agent; attach the attachment agent to the application; and configure the database driver using the attachment agent.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

Figure 1:
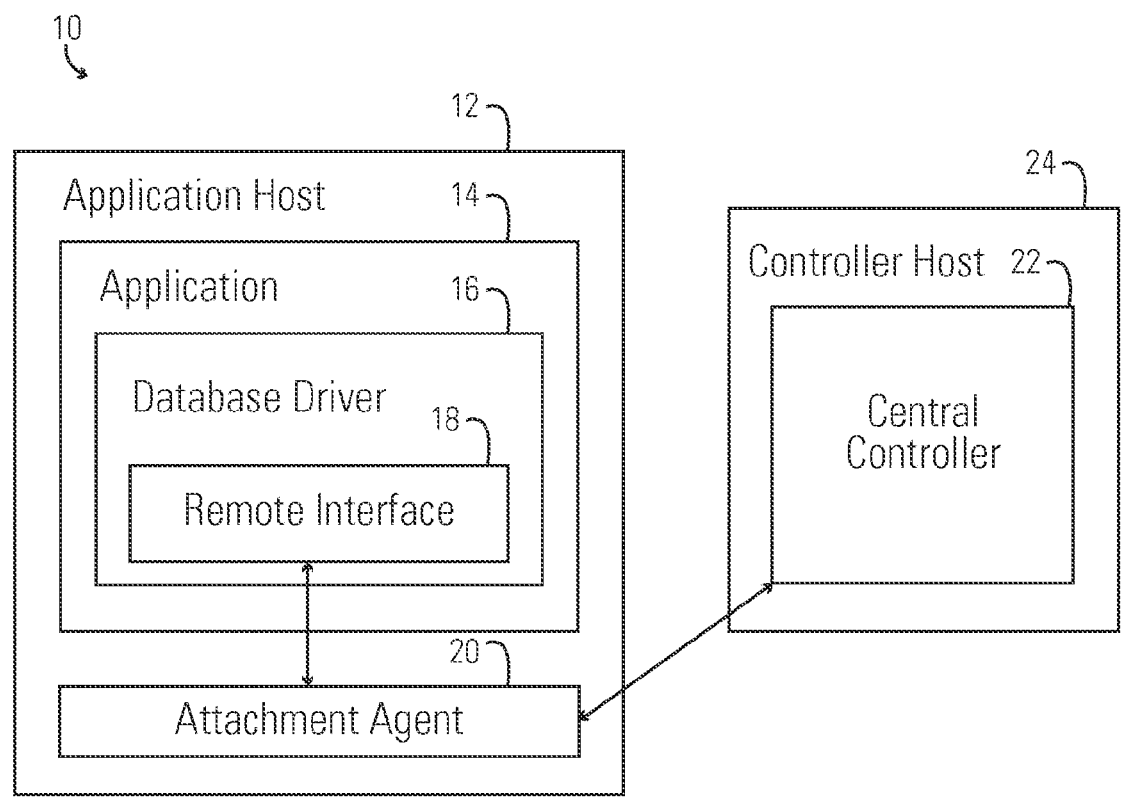
FIG. 1 shows a block diagram of a database driver configuration system in accordance with an embodiment of the invention.

The present invention overcomes the problems associated with the prior art by teaching a system, computer program product, and method for database driver configuration that is global, dynamic, remote and centralized. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The invention addresses problems that may arise when configuring database drivers by providing a system to enable configuration of a database driver globally, dynamically, remotely, and centrally. The system enables a database driver to provide at least 6 key capabilities:

1) Global scope: configuration changes can be applied to the entire application;

2) Dynamic reconfiguration: configuration can be changed at any time;

3) Remote: database clients can be controlled out of process from another system;

4) Both configurable and reconfigurable: database clients can get initial configurations from a central location as well as be reconfigured at any time;

5) Without rebuild: all configuration changes do not require rebuilds, no system downtime; and 6) System scope: configuration of all database clients across processes/machines can be controlled centrally.

The present invention has significant advantages over the state of the art in that it provides a database driver configuration system which is global, dynamic remote and centralized. Prior art systems presented problems with scope and in rebuilding applications. The present invention avoids these problems with a solution that allows is global and dynamic, while not requiring application rebuilds.

Embodiments of the present invention include main key components. The first component provides a set of remote interfaces in the database driver which is responsible for configuration for a single instance of the database driver. Once the set of remote interfaces is available, it needs to be exposed through inter-process communications. This will allow for remote processes to reconfigure configuration. The next main component introduces a central controller process which runs on a network accessible machine. The central controller acts at a central location where a system-wide configuration can be specified. System-wide configuration refers to the configurations of all database driver processes in a given system. The system-wide configuration can be redefined at any time. When it is changed, the new configuration is pushed down to the database clients. The final component of this system is responsible for how database clients are connected to the central controller.

FIG. 1 shows a database driver configuration system 10 in accordance with an embodiment of the invention. The database driver configuration system 10 includes an application host 12, having an application program 14. A database driver 16 included in the application program 14 includes a remote interface component 18. An attachment agent 20 is included in the application host 12 and is coupled to the remote interface 18. A central controller 22 resides in a controller host 24.

In more detail, the remote interface 18 on the database driver 16 allows for configuration of a single instance of the database driver 16. There may be multiple applications 14 each having a single instance of the database driver 16 as described below. The central controller 22 provides a centralized location for system-wide configuration. The central controller 22 runs in its own process and can reside locally or on any network accessible host.

The attachment agent 20 is responsible for connecting database client processes in the application host 12 with the central controller 22. Specifics such as how to connect to the central controller are located in the attachment agent 20. As a result, these specifics can be changed without affecting the application 14. Typically, there would be one attachment agent 20 per host. The attachment agent detects new application processes, attaches to them, and automatically configures the new instance of the database driver 16. After the initial configuration, the attachment agent 20 will also push any new configuration changes dictated by the central controller 22 down to the database driver(s) 16.

Figure 2:
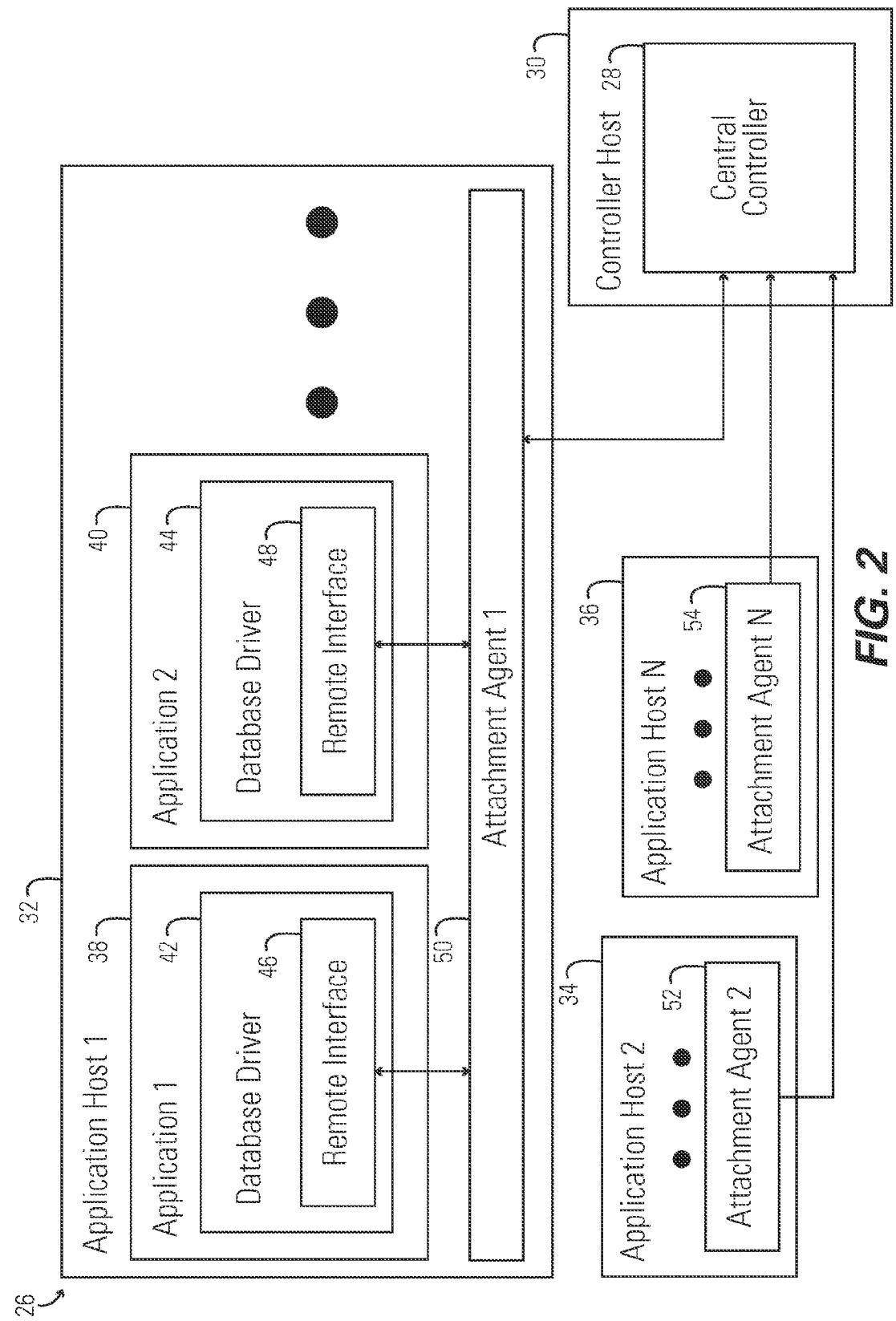
FIG. 2 shows a block diagram of another embodiment of a database driver configuration system in accordance with an embodiment of the invention.

FIG. 2 shows another embodiment of a database driver configuration system 26 in accordance with the invention. System 26 shown in FIG. 3 includes essentially the same components as the system 10 in FIG. 1, but with the central controller coupled to a plurality of application hosts, each of which may have a plurality of applications.

In particular, a central controller 28 residing in a controller host 30 is coupled to multiple application hosts, 32, 34 and 36. The first application host 32 has multiple applications 38 and 40 installed therein. The first application host 32 may have additional applications, which are not shown for simplicity of illustration. Each application 38, 40 has a database driver 42, 44, which, in turn, has a remote interface 46, 48. Each remote interface is coupled to an attachment agent 50 within the application host 32.

Likewise, application hosts 34, 36 each include an attachment agent 52, 54. While not shown to simplify the illustration, the attachment agents 52, 54 may be coupled to a plurality of remote interfaces residing in a plurality of applications, in a similar manner as application host 32.

Figure 3:
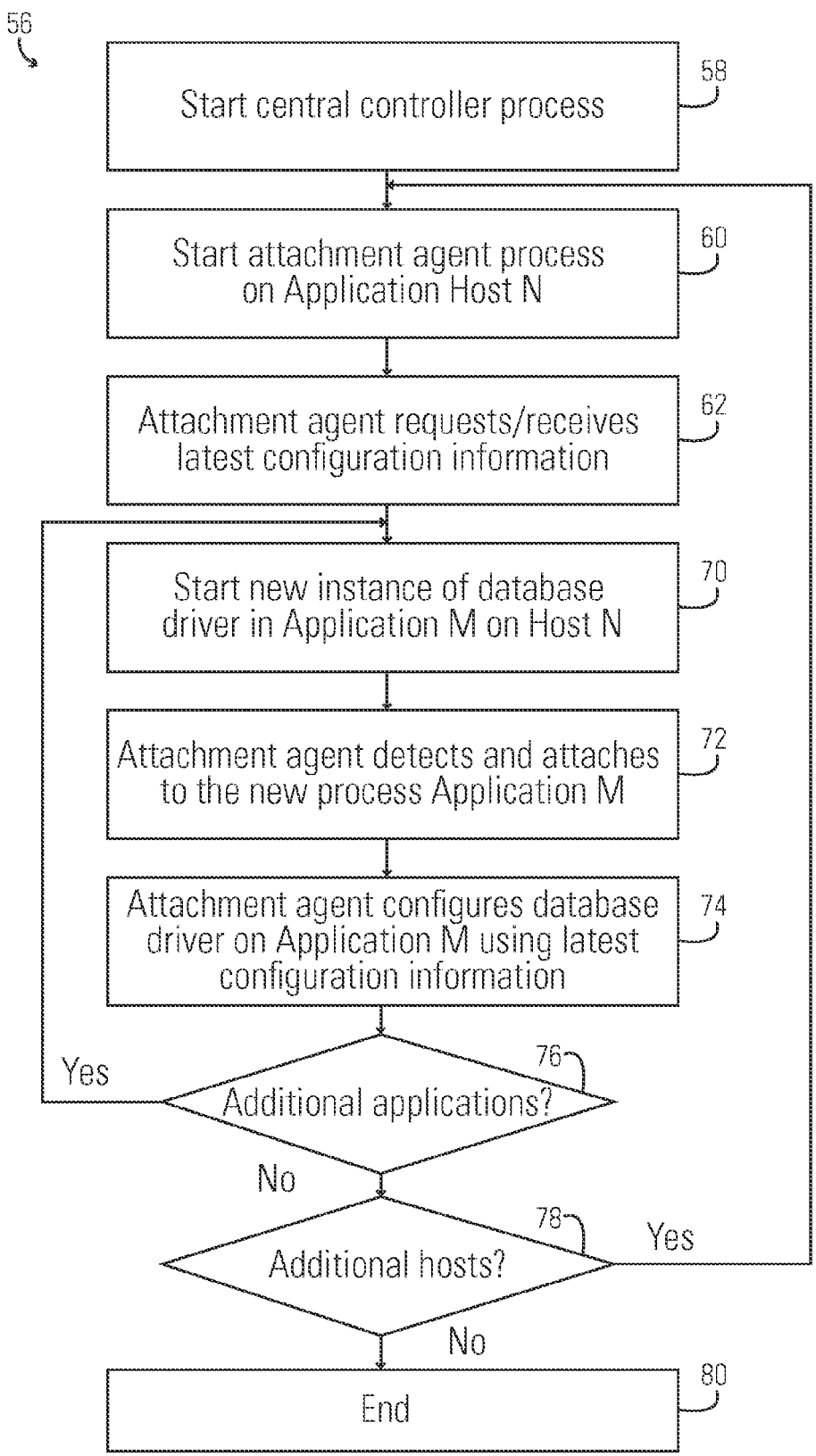
FIG. 3 shows a flow diagram of a database configuration process in accordance with an embodiment of the invention.

The operation of the database driver configuration system 26 is exemplified by process 56 shown in FIG. 3. Step 58 starts the central controller, which may comprise central controller 28 on the controller host 30 shown in FIG. 2. A first attachment agent residing in host 1 is started in step 60. This attachment agent, application host 1 and application 1 may comprise components 50, 32 and 38 respectively shown in FIG. 2. The attachment agent 50 connects to the central controller 28 using the configured connection information for the controller. In step 62 the attachment agent 50 will request/receive the configuration information from the central controller. The central controller 28 may send notifications for future configuration changes.

A new instance of the database driver then will start up in an application process application 1 on application host 1 in step 70. In step 72 the local attachment agent on application host 1 detects that a new process has started up and attaches to the process application 1. In step 74 the local attachment agent on application host 1 uses the latest configuration information from the central controller to configure the database driver in the new process application 1.

Decision step 76 determines if there are additional applications in application host 1, and if so, steps 70, 72 and 74 are repeated for the additional application. Decision step 76 repeats for as long as the agent process is active on the application host. Once all initial m applications on application host 1 have been processed, decision step 78 will determine if there are additional hosts. If there are, the process returns to step 60 to start the attachment agent process on the next application host. Steps 60-76 will then be repeated on the next application host, and on all n application hosts, until decision step 78 determines that there are no more application hosts. The process 56 will then stop at step 80.

Once process 56 has started and initially configured all the database drivers in all the application hosts, changes to the driver configurations are easily made using the techniques of the present invention. In particular, when a system-wide driver configuration property (e.g. property X) is modified on the central controller 28, the central controller 28 may notify all attachment agents of the new value for property X. The attachment agent on application host 1 updates each installed application with the new value for property X. Likewise, the attachment agent on application host 2 will updates the each hosted application with the new value for property X. This process may repeat each time the central controller sends notifications of additional configuration changes.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
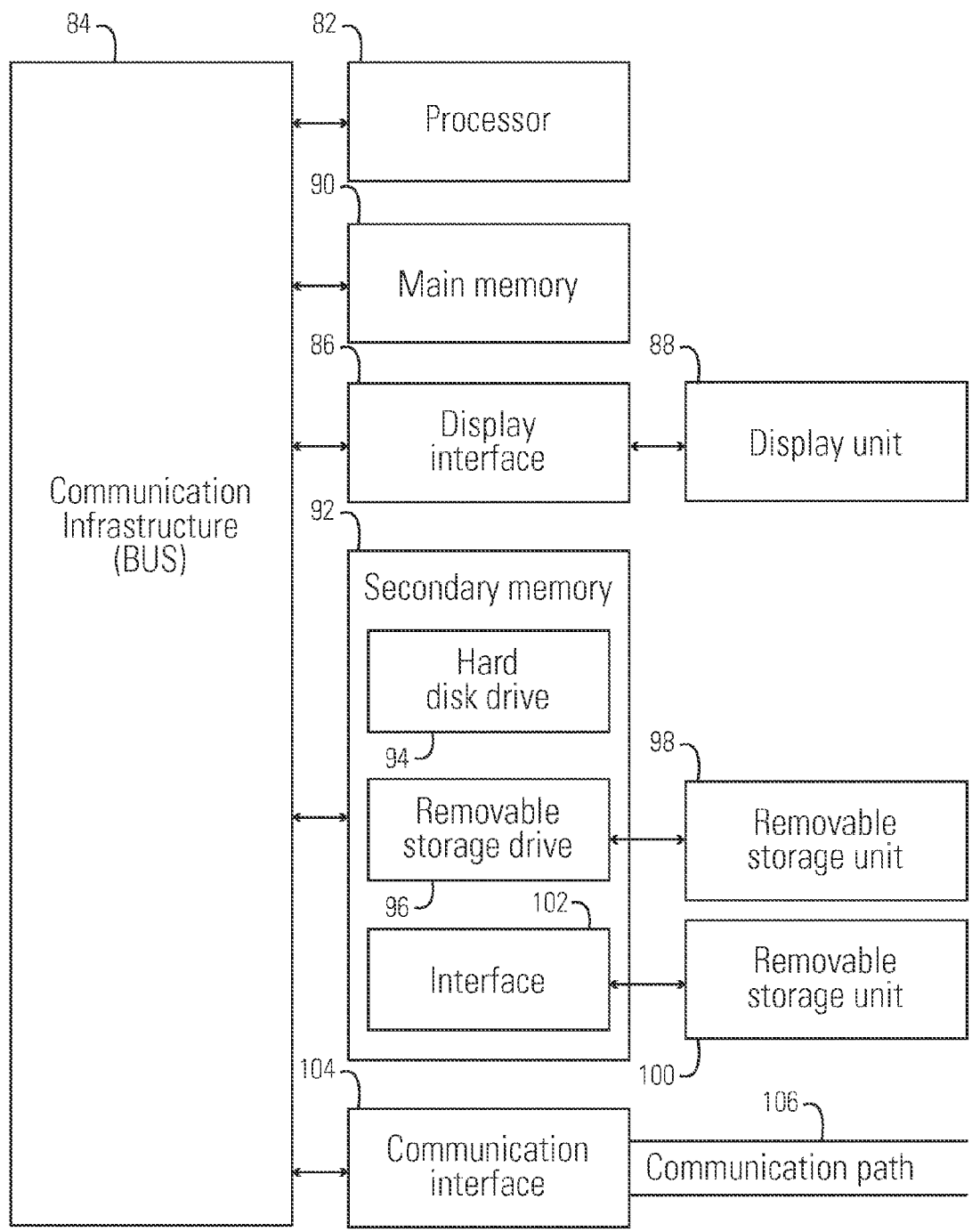
FIG. 4 shows a high level block diagram of an information processing system useful for implementing one embodiment of the present invention.

FIG. 4 is a high level block diagram showing an information processing system useful for implementing one embodiment of the present invention. The computer system includes one or more processors, such as processor 82. The processor 82 is connected to a communication infrastructure 84 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 86 that forwards graphics, text, and other data from the communication infrastructure 84 (or from a frame buffer not shown) for display on a display unit 88. The computer system also includes a main memory 90, preferably random access memory (RAM), and may also include a secondary memory 92. The secondary memory 92 may include, for example, a hard disk drive 94 and/or a removable storage drive 96, representing a floppy disk drive, a magnetic tape drive, an optical disk drive, etc. The removable storage drive 96 reads from and/or writes to a removable storage unit 98 in a manner well known to those having ordinary skill in the art. Removable storage unit 96, represents a floppy disk, a compact disc, magnetic tape, optical disk, etc. which is read by and written to by removable storage drive 96. As will be appreciated, the removable storage unit 98 includes a computer readable medium having stored therein computer software and/or data.

In alternative embodiments, the secondary memory 92 may include other similar means for allowing computer programs or other instructions to be loaded into the computer system. Such means may include, for example, a removable storage unit 100 and an interface 102. Examples of such may include a program cartridge and cartridge interface (such as that found in video game devices), a removable memory chip (such as an EPROM, or PROM) and associated socket, and other removable storage units 100 and interfaces 102 which allow software and data to be transferred from the removable storage unit 100 to the computer system.

The computer system may also include a communications interface 104. Communications interface 104 allows software and data to be transferred between the computer system and external devices. Examples of communications interface 104 may include a modem, a network interface (such as an Ethernet card), a communications port, a PCMCIA slot and card, etc. Software and data transferred via communications interface 104 are in the form of signals which may be, for example, electronic, electromagnetic, optical, or other signals capable of being received by communications interface 104. These signals are provided to communications interface 104 via a communications path (i.e., channel) 106. This channel 106 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 90 and secondary memory 92, removable storage drive 96 and a hard disk installed in hard disk drive 94.

Computer programs (also called computer control logic) are stored in main memory 90 and/or secondary memory 92. Computer programs may also be received via communications interface 104. Such computer programs, when executed, enable the computer system to perform the features of the present invention as discussed herein. In particular, the computer programs, when executed, enable the processor 82 to perform the features of the computer system. Accordingly, such computer programs represent controllers of the computer system.

In accordance with the present invention, we have disclosed systems and methods for configuring database drivers which is global, dynamic, remote and centralized. It also provides a way for applications to automatically configure the database drivers across multiple locations.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A system comprising:
   a processor;
   a first application host, wherein said processor is in said first application host;
   a first application in said first application host;
   a first database driver coupled to said first application;
   a first remote interface coupled to said first database driver for facilitating the configuration of said first database driver;
   a central controller providing system-wide configuration information; and
   a first attachment agent, wherein said first attachment agent executes in the first application host, said first attachment agent providing a connection between said first remote interface and said central controller, and wherein in response to a driver configuration property of global scope being modified on said central controller performing:
   notifying by said central controller to all attachment agents executing in a plurality of application hosts of a new value for said driver configuration property of global scope; and
   updating, by said first attachment agent, each installed application in said first application host with said new value for said driver configuration property of global scope, wherein, said central controller, using said first attachment agent and said first remote interface, changes the configuration of said database driver.

2. The system of claim 1 further comprising:
   a second application in said first application host;
   a second database driver coupled to said second application;
   said second database driver having a second remote interface coupled thereto; and
   said first attachment agent being coupled to said first and second remote interfaces, said first attachment agent providing a connection between said first and second remote interfaces and said central controller.

3. The system of claim 2 further comprising:
   a second application host;
   a third application in said second application host;
   a third database driver in said third application;
   a third remote interface in said third database driver; and
   a second attachment agent providing a connection between said third remote interface and said central controller.

4. The system of claim 3 wherein said central controller specifies database driver configuration for first, second and third database drivers.

5. The system of claim 3 wherein said central controller specifies changes in said database driver configuration for said first second and third database drivers.

6. The system of claim 1 wherein said first application host has a single attachment agent.

7. The system of claim 1 wherein said first attachment agent is configured to detect a new application in said first application host, attach to said new application and configure a new instance of said first database driver for said new application.

8. A database driver configuration system comprising:
   a processor;
   a remote controller host, wherein said processor is in said remote controller host;
   a central controller disposed in said remote controller host;
   a plurality of application hosts;
   a plurality of applications disposed in each of said application hosts;
   a single attachment agent disposed in each of said application hosts, said single attachment agent being coupled to each of said plurality of applications in said application hosts, wherein said central controller provides each of said attachment agents with information regarding how to connect said database driver to said central controller, wherein said single attachment agent is configured to detect a new application in a first application host, attach to said new application and configure a new instance of a database driver for said new application, and wherein in response to a driver configuration property of global scope being being modified on said central controller performing:
   notifying by said central controller to all attachment agents executing in a plurality of application hosts of a new value for said driver configuration property of global scope; and
   updating, by said first attachment agent, each installed application in said first application host with said new value for said driver configuration property of global scope, wherein, said central controller, using said first attachment agent and said first remote interface, changes the configuration of said database driver.

9. The system of claim 8 wherein said central controller provides each of said attachment agents with reconfiguration information regarding changes in how to connect the database driver to said central controller.

10. A method of configuring a database driver comprising:
   receiving configuration information in an attachment agent from a remote central controller, wherein said attachment agent executes in an application host, said attachment agent providing a connection between a remote interface in a database driver and said central controller, said attachment agent containing specific information regarding how to connect said database driver to said central controller;
   starting a first instance of said database driver in a first application;
   detecting a second application using said attachment agent;
   attaching said attachment agent to said first application; and
   configuring said first instance of said database driver using said attachment agent, and wherein in response to a driver configuration property of global scope being modified on said central controller performing:

notifying by said central controller to all attachment agents executing in a plurality of application hosts of a new value for said driver configuration property of global scope; and updating, by said first attachment agent, each installed application in said first application host with said new value for said driver configuration property of global scope, wherein, said central controller, using said first attachment agent and said first remote interface, changes the configuration of said database driver.

11. The method of claim 10 wherein said configuring comprises transferring configuration information from said attachment agent to a remote interface in said database driver.

12. The method of claim 10 further comprising:
starting a second instance of said database driver in said second application;
attaching said attachment agent to said second application; and
configuring said second instance of said database driver using said attachment agent.

13. The method of claim 10 further comprising reconfiguring said database driver, said reconfiguring comprising:
receiving reconfiguration information in said attachment agent; and
reconfiguring said first instance of said database driver using said attachment agent.

14. The method of claim 13 wherein said receiving reconfiguration information comprises receiving reconfiguration information from a remote central controller.

15. The method of claim 13 wherein said reconfiguring said database driver comprises transferring configuration information from said attachment agent to a remote interface in said database driver.

16. A storage having a computer readable program, wherein said computer readable program when executed by a processor causes said processor to:
receive configuration information in an attachment agent from a remote central controller, wherein said attachment agent executes in an application host, said attachment agent providing a connection between a remote interface in a database driver and said central controller, said attachment agent containing specific information regarding how to connect said database driver to said central controller;
start a first instance of a database driver in a first application;
detect a second application using said attachment agent;
attach said attachment agent to said first application; and
configure said first instance of said database driver using said attachment agent, and wherein in response to a driver configuration property of global scope being modified on said central controller performing:
notifying by said central controller to all attachment agents executing in a plurality of application hosts of a new value for said driver configuration property of global scope; and
updating, by said first attachment agent, each installed application in said first application host with said new value for said driver configuration property of global scope, wherein, said central controller, using said first attachment agent and said first remote interface, changes the configuration of said database driver.

17. The storage of claim 16 wherein said configure step comprises transfer configuration information from said attachment agent to a remote interface in said database driver.

18. The storage of claim 16 wherein said computer readable program when executed on a computer further causes said computer to:
start a second instance of said database driver in said host;
attach said attachment agent to said second application; and
configure said second instance of said database driver using said attachment agent.

19. The storage of claim 18 wherein said computer readable program when executed on a computer further causes said computer to reconfigure said first instance of said database driver, said reconfiguring comprising:
receiving reconfiguration information in said attachment agent; and
reconfiguring said first instance of said database driver using said attachment agent.

* * * * *